W. V. ISGRIG.
BUMPER BAR.
APPLICATION FILED SEPT. 15, 1919.
1,424,359.
Patented Aug. 1, 1922.
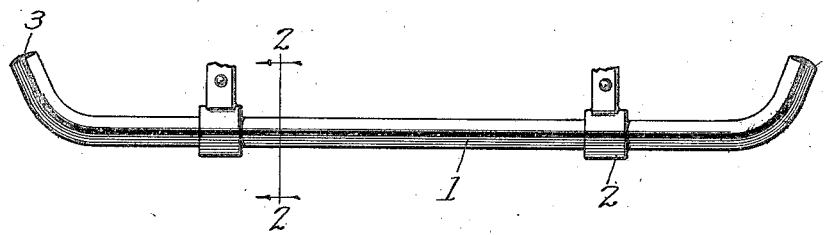
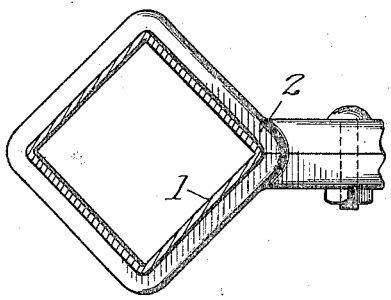
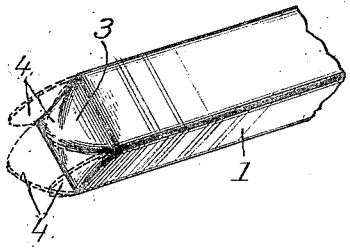
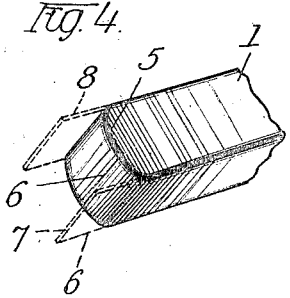
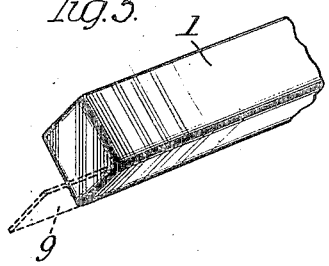
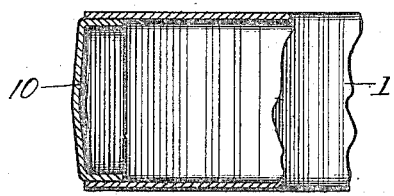
Inventor
Walter V. Isgrig
Edwin B. H. Town Jr. Atty.

UNITED STATES PATENT OFFICE.

WALTER V. ISGRIG, OF MILWAUKEE, WISCONSIN, ASSIGNOR TO BADGER MANUFACTURING CORPORATION, OF MILWAUKEE, WISCONSIN, A CORPORATION OF DELAWARE.

BUMPER BAR.

1,424,359.    Specification of Letters Patent.    Patented Aug. 1, 1922.

Application filed September 15, 1919. Serial No. 323,902.

*To all whom it may concern:*

Be it known that I, WALTER V. ISGRIG, a citizen of the United States, residing at Milwaukee, in the county of Milwaukee and State of Wisconsin, have invented new and useful Improvements in Bumper Bars, of which the following is a specification.

This invention relates to a bumper bar.

One of the objects of this invention is to provide a tubular bumper bar having sealed ends.

A further object is to provide a tubular bumper bar which may be electroplated, enameled or otherwise coated without danger of the liquids entering the tubular bumper bar.

Another object is to provide a hermetically sealed tubular bumper bar having a smooth exterior surface and presenting a neat and attractive appearance.

Other objects will appear.

Embodiments of the invention are shown in the accompanying drawing.

The views of the drawing are:

Fig. 1 is a top plan of a bumper bar with a portion of the supporting brackets.

Fig. 2 is a vertical section on line 2—2 of Fig. 1.

Fig. 3 is an end perspective of the bumper bar, showing in full lines the finished end and in dotted lines the form it assumes at an intermediate stage in its manufacture.

Figs. 4 and 5 are perspectives of other forms of bumper bar ends.

Fig. 6 is a section through another form of bumper bar end.

The bumper bar is formed of tubing, preferably seamless tubing, which, although shown as of rectangular cross section, may be of hexagonal, octagonal, circular, or other cross section.

Fig. 1 shows the complete bumper bar 1 as it appears when mounted in the supporting brackets 2.

Fig. 3 shows one form of sealed end 3. The tubular bar, after being cut to the correct length is slitted, or cut at the end, so as to form a plurality of flaps 4, as shown in dotted lines. The flaps are then bent inwardly, into juxtaposition, as indicated in full lines, and the adjacent edges joined by brazing, soldering, welding, or in any other manner to effect a complete sealing of the ends. The flaps 4 are of substantially triangular shape and may have curved edges to form a rounded pyramidal end.

Fig. 4 shows another method of forming a sealed end. The bar is slit at the ends and the pair of edges 5 are given a rounded outline. The flaps 6 are left in their rectangular shape, as shown in dotted lines, and are subsequently bent inwardly so that their edges 7 lie adjacent each other and the edges 8 adjacent the edges of the flaps 5. Thereafter all the edges are joined by any suitable method such as described in connection with Fig. 3.

Fig. 5 shows a further method of sealing the ends of the bar. A single flap 9 is formed at the end of the bar and is bent inwardly. The edges of this flap are secured to the adjacent edges of the tube by any suitable method, as previously described.

Fig. 6 shows a further method of sealing the ends of the bar. A rectangular hollow cap, or plug 10 is slipped into the tube and thereafter secured in place by any suitable method, such as previously described.

The bar may be bent adjacent its ends, as shown in Fig. 1, either before or after the sealing of the ends, or else may be left straight.

This tubular bumper bar has sealed ends of neat and attractive appearance. Also, such a bar may be electroplated, enamelled or otherwise coated without danger of the solutions entering the interior of the tubular bar.

Obviously other structures may be devised which will embody the invention herein set forth.

What I claim is,

1. A bumper bar having a seamless tubular body and structurally integral end portions folded together and secured by molecular adhesion to provide a hermetically sealed body.

2. A bumper bar comprising a seamless hollow body, and ears formed on the ends of and integral with said body, said ears being bent at substantially right angles to the axis of the bumper bar and joined by molecular adhesion to prevent ingress of moisture to the interior of the bar.

3. A bumper bar comprising a seamless tubular casing, a plurality of ears formed on the ends of said casing and bent over at substantially right angles to the body of the bumper, said ears being welded together to form a hermetically sealed casing.

4. A tubular bumper bar having end closing members molecularly united thereto so as to hermetically seal the same.

5. A tubular bumper bar having end plates closing the ends thereof and molecularly united thereto so as to hermetically seal the same.

6. A bumper bar comprising a tube and end closing members secured thereto by molecular adhesion so as to hermetically seal the same.

In witness whereof, I have hereunto subscribed my name.

WALTER V. ISGRIG.